UNITED STATES PATENT OFFICE.

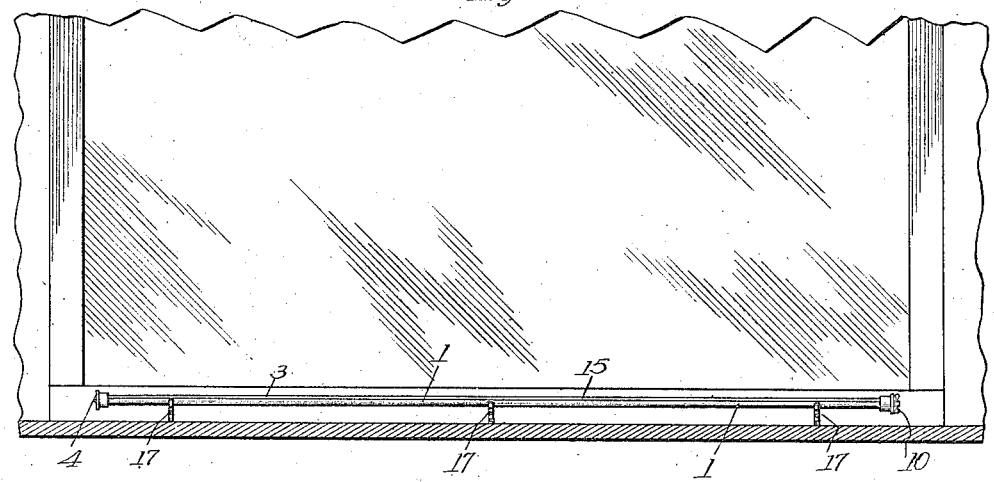
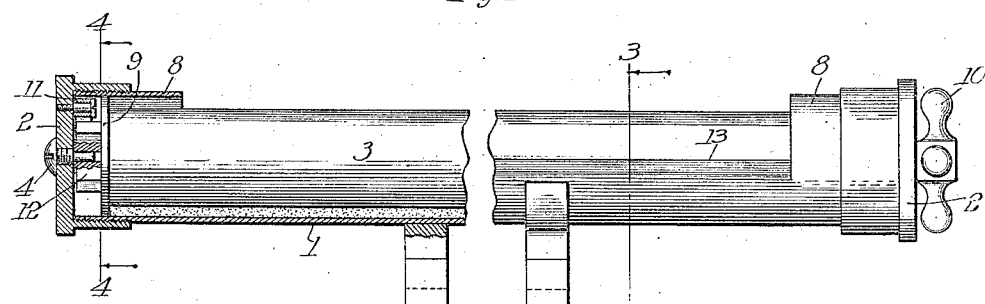
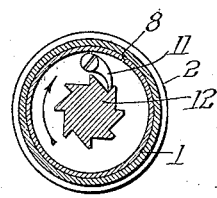
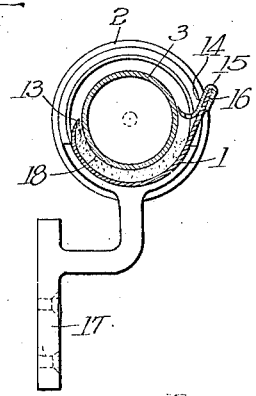
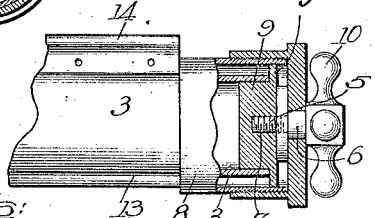

HERMAN OTTO WENDE, OF CHICAGO, ILLINOIS.

FLY-CATCHER.

1,239,148. Specification of Letters Patent. Patented Sept. 4, 1917.

Application filed July 24, 1912. Serial No. 711,236.

*To all whom it may concern:*

Be it known that I, HERMAN OTTO WENDE, a subject of the Emperor of Germany, and a resident of Chicago, in the county of Cook and State of Illinois, have invented a certain new and useful Improvement in Fly-Catchers, of which the following is a specification.

This invention relates to insect traps.

The object of the invention is to provide a mechanical device of substantial and durable construction, designed and adapted to be placed in a store window or other place calculated to attract flies, and constructed and arranged to present an exposed surface adapted to be coated with a sticky or other desirable mixture or substance which will attract flies and other insects, and from which said flies or other insects alighting and adhering thereto may be readily removed and which may quickly and conveniently be replaced with a freshly coated surface.

To effect this object, an insect trap of my invention comprises the various features and details of construction hereinafter described and claimed.

In the accompanying drawing, in which my invention is fully illustrated,—

Figure 1 is a side view, partly in section, of an insect trap of my invention;

Fig. 2 is a top plan view, partly in section, of one end thereof;

Figs. 3 and 4 are sectional views on the lines 3—3 and 4—4, respectively, of Fig. 1; and Fig. 5 is a front view of the bottom part of a window, with an insect trap of my invention secured to the lower side of the sash thereof.

My improved insect trap comprises a trough-shaped body portion 1 the ends of which are closed by suitable heads consisting, as shown, of caps 2 threaded to the ends of said body portion 1, thus providing for quickly and conveniently removing and replacing the same. Where the heads 2 are threaded to the body portion 1, the ends of said body portion form complete cylinders in order to impart requisite strength and stiffness thereto for threading the same and for forming tight joints at the ends of said body portion around said heads 2.

My invention, however, contemplates securing said heads to said body portion in any other desired or approved manner.

Rotatably mounted within said trough-shaped body portion 1 so that the upper side thereof will be exposed through the open upper side of said trough-shaped body portion 1 is a rotatable member 3. Said rotatable member is preferably cylindrical in shape and, as shown, is rotatably mounted in said body portion by screw studs 4 and 5, of which the stud 4 is secured in screw-threaded engagement with a hole in one of the heads of said body portion, the end thereof being reduced to form a pin which rotatably engages a bearing in one end of the member 3, and the other stud 5 comprises a cylindrical section 6 which engages a bearing formed in the other head of the body portion, and a screw-threaded end section 7 which engages a correspondingly screw-threaded hole in the opposite end of the rotatable member 3.

The body portion 1 and the rotatable member 3 of my improved device may be made conveniently and economically from sections of metal tube, as Shelby steel tubing, by cutting out the upper side of the tube forming the body portion 1 between its ends leaving the cylindrical end portions, as shown at 8, and by merely securing plugs 9 in the ends of the tube forming the rotatable member 3.

The outer end of the screw stud 5 projects through the head of the body portion and secured thereto is a handle 10 by which the rotatable member 3 may be conveniently turned.

The member 3 is designed to be always rotated in the direction indicated by the arrow, Fig. 4, rotation thereof in the opposite direction being prevented by means of a pawl 11 pivoted to one of the heads 2 of the body portion 1, which is adapted to engage the teeth of a ratchet wheel 12 on the rotatable member 3, said ratchet wheel, as shown, being formed integral with the plug secured in the end of said member 3 adjacent to said pawl.

The upper edge 13 of the body portion 1, away from which the exposed surface of the member 3 rotates, preferably extends into close proximity to the surface of said member 3, say one thirty-second of an inch, and supported on the opposite edge of the body portion 1 is a trough 14, the free edge of which likewise extends into close proximity to the surface of the member 3.

In the preferable construction shown, said trough 14 is formed separate from the body portion 1 and is adapted to be detachably secured thereto in any suitable manner, desirable means for this purpose consisting of a groove 15 formed in said trough 14 by the turned over edge 16 thereof, which is adapted to receive the edge of the body portion 1 to which it is designed to be attached, preferably so as to closely embrace the same.

Formed in the bottom of the trough 14 are drain holes or openings through which any liquid which may accumulate in said trough may drain into the body portion 1.

As shown, my improved insect trap is designed and adapted to be secured to the lower sash of a window or in any other exposed place calculated to attract flies and other insects, by means of brackets 17, on the body portion 1 thereof, which are adapted to be fastened to the bottom side of the window sash by means of screws or the like.

In operation, the trough-shaped body portion 1 is designed to contain the mixture or substance, indicated at 18, with which it is desired to coat the exposed surface of the rotatable member 3, the level of said mixture or substance being above the lower side of the rotatable member 3 so that said rotatable member 3 will dip into the same. Preferably, however, the level of said mixture or substance will be below the pivot bearings of said rotatable member, so as to prevent leakage therethrough.

The manner of using my improved insect trap is as follows:—

A quantity of the sticky mixture or substance 18, sufficient to fill the same to the desired level, is first poured into the trough-shaped body portion 1. The rotatable member 3 is then turned by means of the handle 10 to expose a surface thereof which has passed through said mixture or substance 18 and is coated therewith, the edge 13 of said body portion operating to remove superfluous mixture or substance 18 from the surface of said rotatable member and leaving a uniform coating thereon. A freshly coated surface of the rotatable member 3 may at any time be exposed in the manner described by rotation of the member 3.

As the member 3 rotates, the free edge of the trough 14 will operate to scrape and remove from the surface of said member 3 any flies, insects or other foreign substances adhering to the exposed surface of said member 3, which will accumulate in said trough, whence they may be conveniently removed. Any of the mixture or substance 18 which may accumulate in the trough 14 will drain through the openings in the bottom thereof into the trough formed by the body portion 1.

When desired, the trough 14 may be quickly and conveniently cleaned by simply removing said trough from the body portion 1, washing it, and then replacing it.

It will be observed that each of the plugs 9 is provided with a circumferential flange 9′ which contacts with the inner face of the adjacent cylinder 8 at a distance from the end cap 2, these flanges 9′ serving as dams to prevent the sticky substance working to the bearings of the cylinder or to the ratchet devices.

I claim:—

1. An insect trap comprising a trough-shaped body provided with a cylinder at each end, a cap covering the outer end of each cylinder, a trap-cylinder mounted in the trough having its ends extended into said trough-cylinder, each end of the trap-cylinder being provided with a circumferential flange fitting the adjacent trough-cylinder, and bearings for the trap-cylinder beyond said flange.

2. In an insect trap, an elongated trough, said trough being provided with a short cylinder at each end, whose outer end is closed, a cylinder extending the length of said trough and lying within it and having its ends extended into said short cylindrical trough-ends, means for supporting the elongated cylinder within the cylindrical trough ends, means for manually rotating the elongated cylinder, and an insect scraper extending along one edge of the trough.

In testimony, that I claim the foregoing as my invention, I affix my signature in the presence of two subscribing witnesses this 15th day of July, A. D., 1912.

HERMAN OTTO WENDE.

Witnesses:
S. J. DORVIS,
MARY H. BIXEL.